United States Patent
Covic et al.

(10) Patent No.: US 10,566,838 B2
(45) Date of Patent: Feb. 18, 2020

(54) INDUCTIVE POWER TRANSFER SYSTEM

(75) Inventors: Grant Anthony Covic, Sandringham (NZ); Michael Le Gallais Kissin, Takapuna (NZ)

(73) Assignee: AUCKLAND UNISERVICES LIMITED, Auckland (NZ)

(*) Notice: Subject to any disclaimer, the term of this patent is extended or adjusted under 35 U.S.C. 154(b) by 514 days.

(21) Appl. No.: 13/389,090

(22) PCT Filed: Aug. 6, 2010

(86) PCT No.: PCT/NZ2010/000160
§ 371 (c)(1),
(2), (4) Date: Jun. 8, 2012

(87) PCT Pub. No.: WO2011/016737
PCT Pub. Date: Feb. 10, 2011

(65) Prior Publication Data
US 2012/0248892 A1    Oct. 4, 2012

Related U.S. Application Data

(60) Provisional application No. 61/273,701, filed on Aug. 7, 2009.

(51) Int. Cl.
*H02J 50/12* (2016.01)
*B60L 53/12* (2019.01)
(Continued)

(52) U.S. Cl.
CPC .............. *H02J 50/12* (2016.02); *B60L 53/12* (2019.02); *H01F 38/14* (2013.01); *H02J 7/025* (2013.01);
(Continued)

(58) Field of Classification Search
CPC .. H02J 17/00; H02J 50/00; H02J 50/80; H02J 50/10; H02J 50/90; H02J 50/12;
(Continued)

(56) References Cited

U.S. PATENT DOCUMENTS 4,331,225 A  5/1982  Bolger
4,836,344 A  6/1989  Bolger
(Continued)

FOREIGN PATENT DOCUMENTS

CN   1595765   3/2005
CN   1281436   10/2006
(Continued)

OTHER PUBLICATIONS

Michael L.G. Kissin et al., Interphase Mutual Inductance in Polyphase Inductive Power Transfer Systems, IEEE Transactions of Industrial Electronics, vol. 56, No. 7, pp. 2393-2400 Jul. 2009.
(Continued)

*Primary Examiner* — Carlos Amaya

(57) ABSTRACT

A magnetic flux pad (BPP) is provided for generating or receiving magnetic flux. The pad may be used with an inductive power transfer system, and comprises a magnetically permeable core (4) and two substantially flat overlapping coils (2, 3) magnetically associated with the core (4). The coils (2, 3) are arranged so that there is essentially no mutual coupling between them.

28 Claims, 8 Drawing Sheets

The DDP pad seen from the side (top) and from above (bottom).

(51) Int. Cl.
- *H02J 50/80* (2016.01)
- *H02J 50/90* (2016.01)
- *H02J 50/70* (2016.01)
- *H02J 7/02* (2016.01)
- *H02J 50/40* (2016.01)
- *H01F 38/14* (2006.01)

(52) U.S. Cl.
CPC .............. *H02J 50/40* (2016.02); *H02J 50/70* (2016.02); *H02J 50/80* (2016.02); *H02J 50/90* (2016.02); *B60L 2200/26* (2013.01); *Y02T 10/7072* (2013.01); *Y02T 90/122* (2013.01); *Y02T 90/14* (2013.01)

(58) Field of Classification Search
CPC .. H02J 50/40; H02J 50/70; H02J 7/025; H02J 5/005; H01F 38/14; B60L 11/182; B60L 2200/26; Y02T 10/7072; Y02T 90/122; Y02T 90/14
USPC .......................................................... 307/104
See application file for complete search history.

(56) References Cited

U.S. PATENT DOCUMENTS

| | | | |
|---|---|---|---|
| 5,207,304 | A | 5/1993 | Lechner et al. |
| 5,293,308 | A | 3/1994 | Boys et al. |
| 5,311,973 | A | 5/1994 | Tseng et al. |
| 5,573,090 | A | 11/1996 | Ross |
| 5,821,728 | A | 10/1998 | Schwind |
| 6,317,338 | B1 | 11/2001 | Boys |
| 6,879,889 | B2 | 4/2005 | Ross |
| 7,521,890 | B2 * | 4/2009 | Lee ................... H02J 5/005 320/108 |
| 8,030,888 | B2 | 10/2011 | Pandya et al. |
| 2001/0005136 | A1 * | 6/2001 | Misic ................ G01R 33/3415 324/318 |
| 2008/0265684 | A1 * | 10/2008 | Farkas ................ B60L 11/005 307/104 |
| 2012/0119698 | A1 * | 5/2012 | Karalis et al. ............... 320/108 |

FOREIGN PATENT DOCUMENTS

| | | |
|---|---|---|
| JP | 2-133101 | 11/1990 |
| JP | 2-133102 | 11/1990 |
| JP | 7-61350 | 3/1995 |
| JP | 7-67206 | 3/1995 |
| JP | 7-170612 | 7/1995 |
| JP | 2002359902 | 12/2002 |
| JP | 200642519 | 2/2006 |
| JP | 2006529079 | 12/2006 |
| JP | 2007501600 | 1/2007 |
| JP | 2008109839 | 5/2008 |
| JP | 2009164293 | 7/2009 |
| JP | 4778432 | 7/2011 |
| WO | WO 9850993 | 11/1998 |
| WO | WO 9908359 | 2/1999 |
| WO | WO 2006118474 | 11/2006 |
| WO | WO 2007090168 | 8/2007 |
| WO | WO 2008140333 | 11/2008 |

OTHER PUBLICATIONS

Grant A. Covic et al., A Three-Phase Inductive Power Transfer System for Roadway-Powered Vehicles, IEEE Transactions of Industrial Electronics, vol. 54, No. 6, pp. 3370-3378, Dec. 2007.

Doron Kwiat et al., Calculation of the Mutual Induction Between Coplanar Circular Surface Coils in Magnetic Resonance Imaging, IEEE Transactions on Biomedical Engineering, vol. 39, No. 5, pp. 433-436, May 1992.

U.S. Appl. No. 13/389,210, filed Feb. 6, 2012.

* cited by examiner

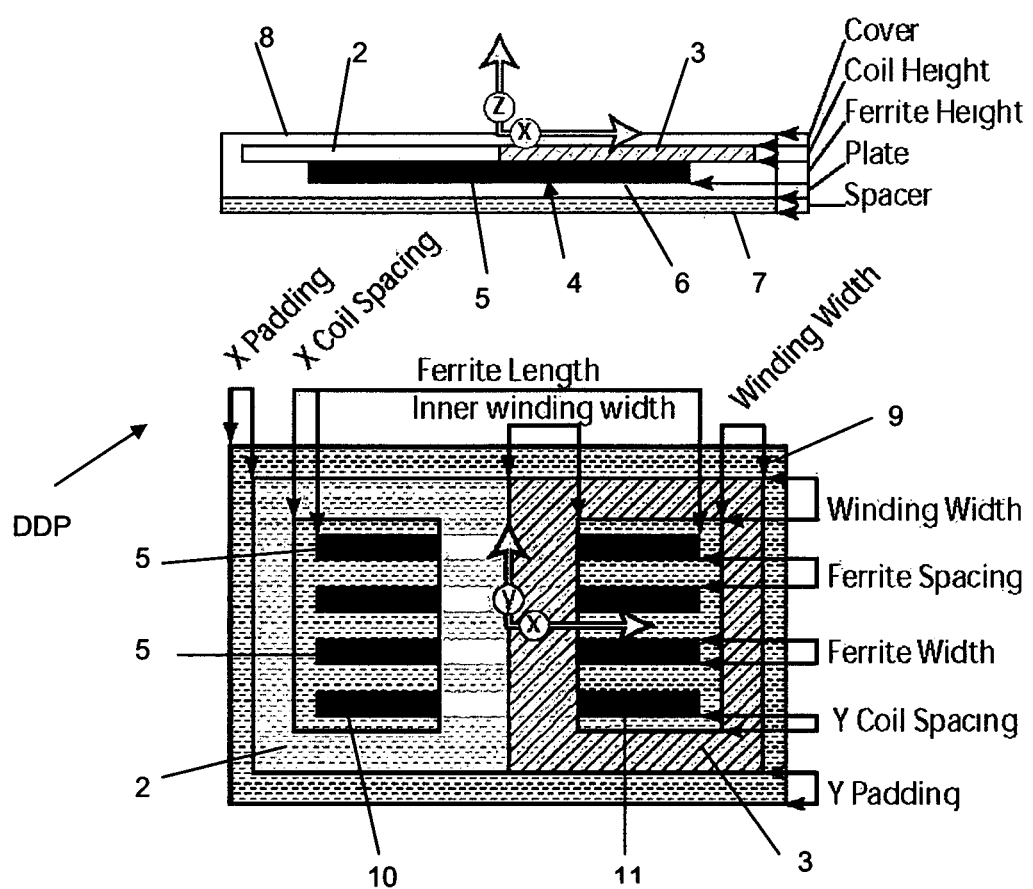
Figure 1: The DDP pad seen from the side (top) and from above (bottom).

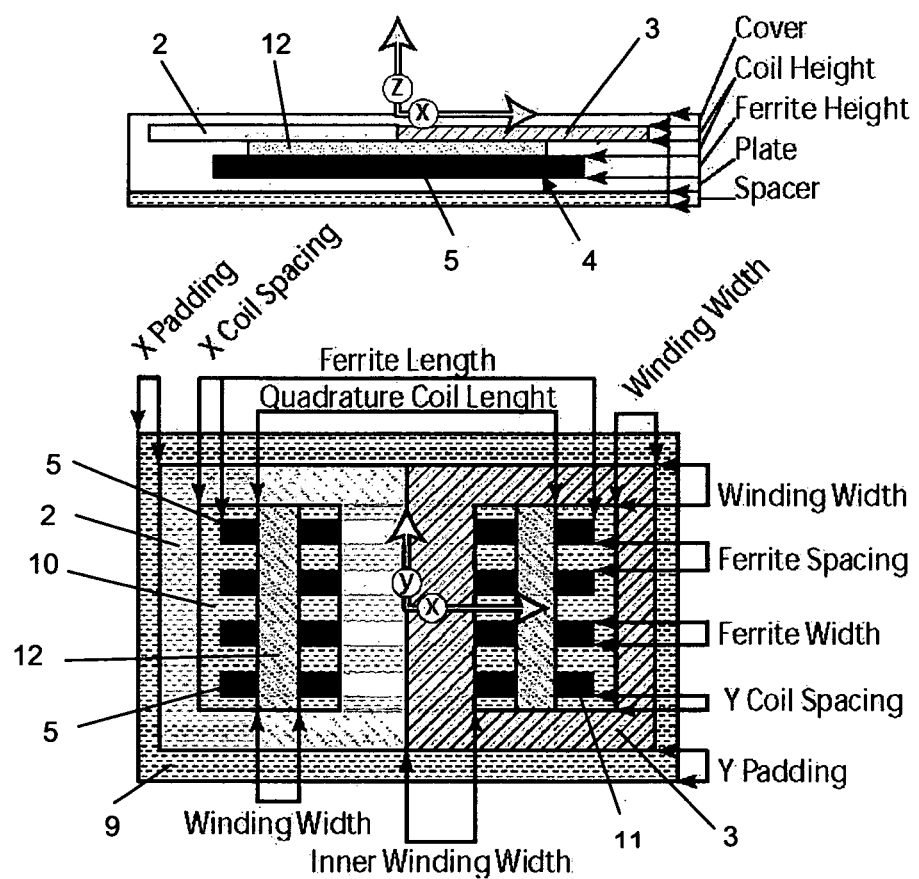
Figure 2: The double D quadrature pad seen from the side (top) and from above (bottom).

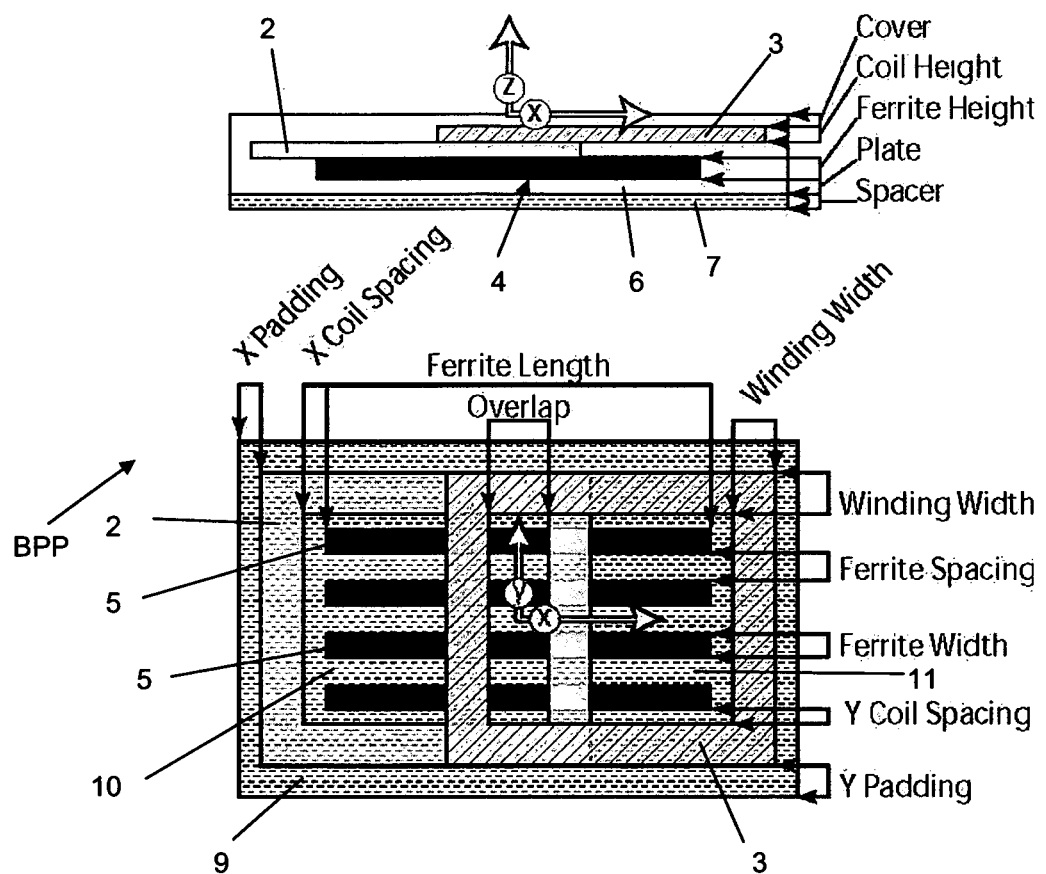
Figure 3: The bipolar pad seen from the side (top) and from above (bottom).

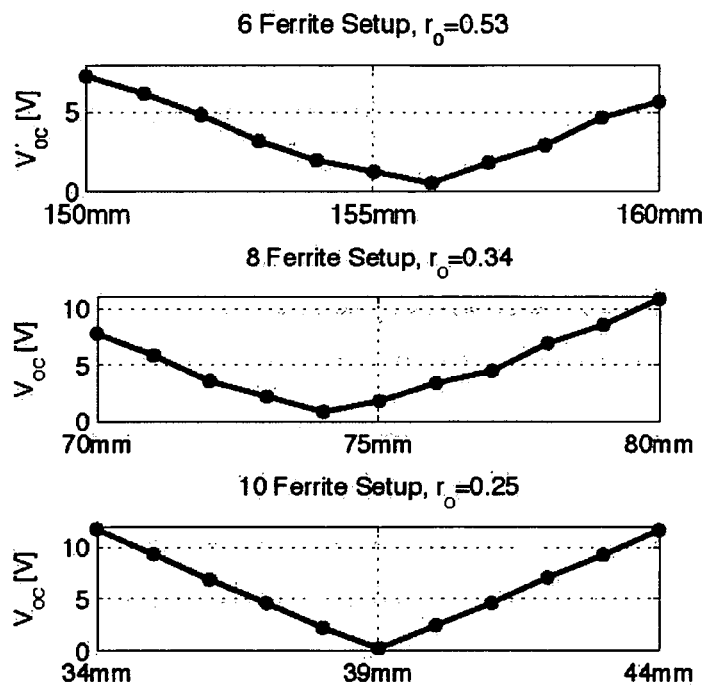
Figure 4: Open circuit voltage coupled in the second BPP coil as a function of overlap when the first coil is energised.
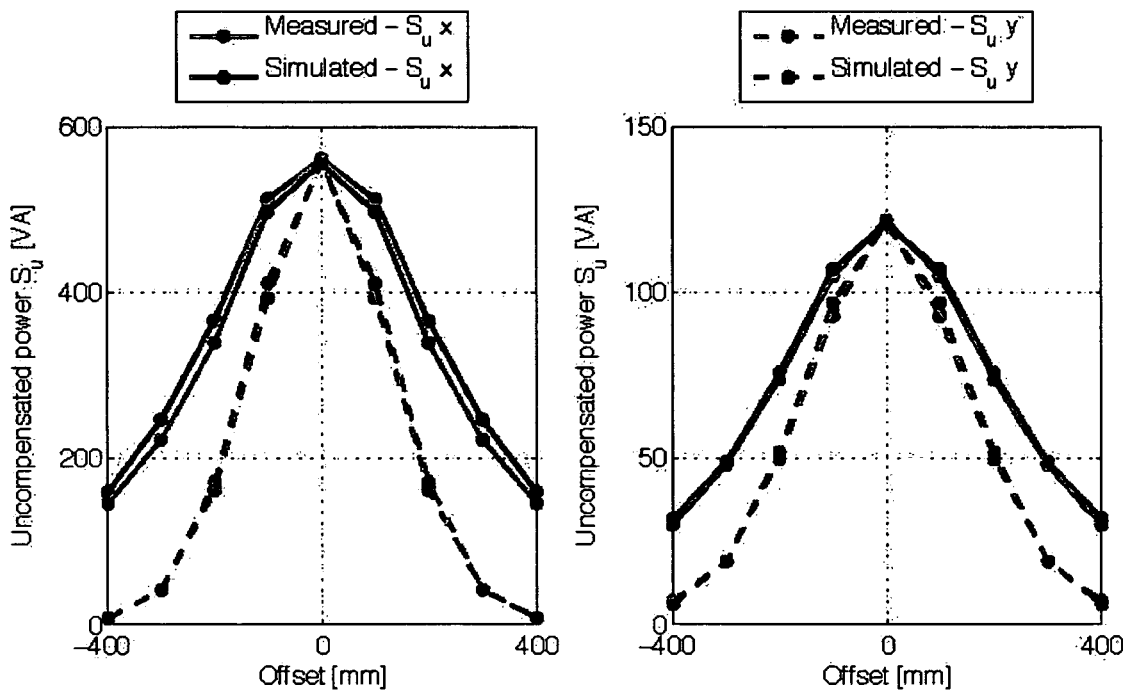
Figure 5: Measured and simulated power of a BPP with ten turns in each coil using six ferrite slabs to construct each of the ferrite strips in the base. Vertical displacements are 150 mm in the left column, and 250 mm in the right column.

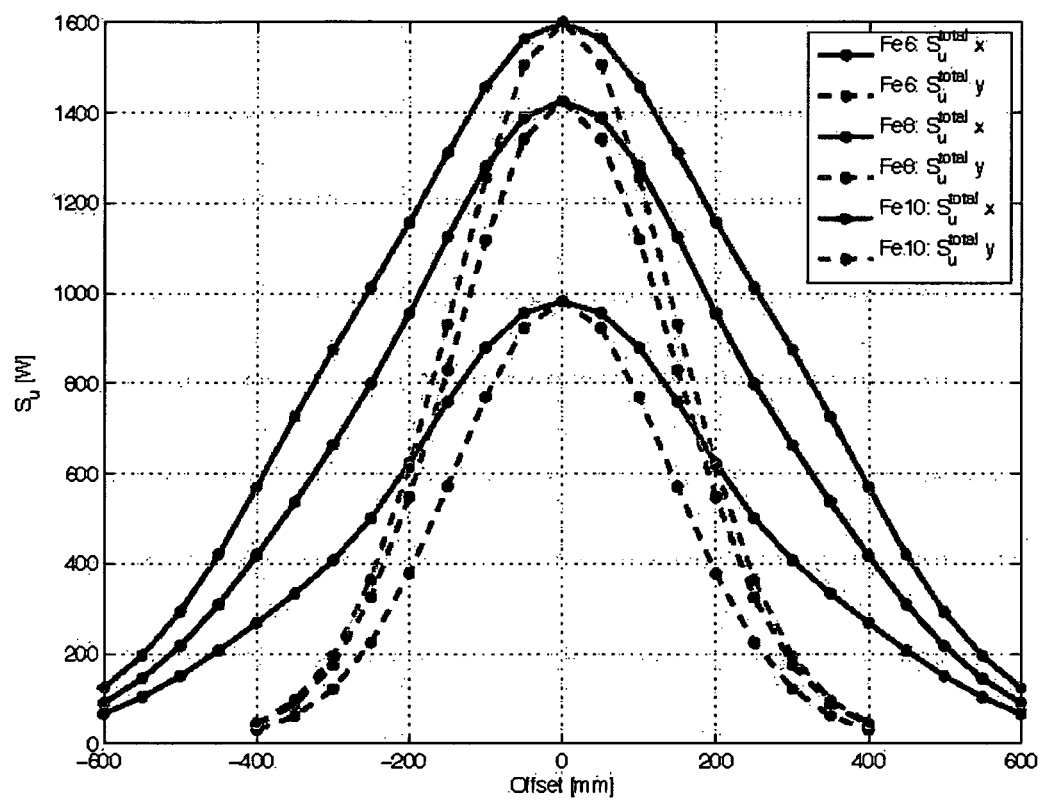
Figure 6: Uncompensated power for the three BPP setups with the pickup offset either in the x or y direction at 200 mm vertical separation

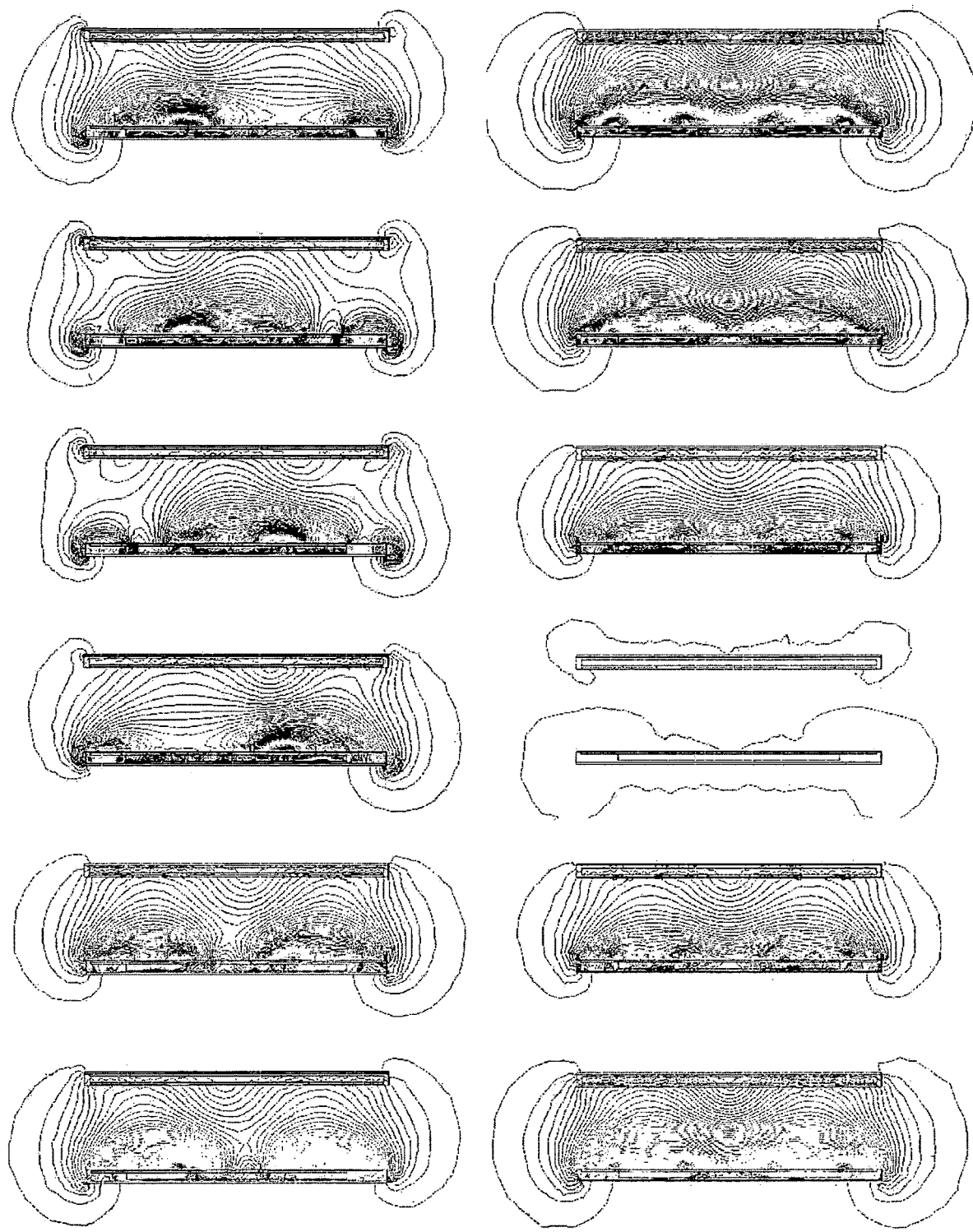
Figure 7: Field plots of both the BPP8 and DDP coupling to a DDQP receiver, at various instances in time over a full cycle of the primary resonant current. From top to bottom shows 0, 30, 60, 90, 120 and 150 degrees (where in the bipolar the other phase is operated with 90 degree separation). Left Column: BPP with 8 ferrites, Right Column: DDP

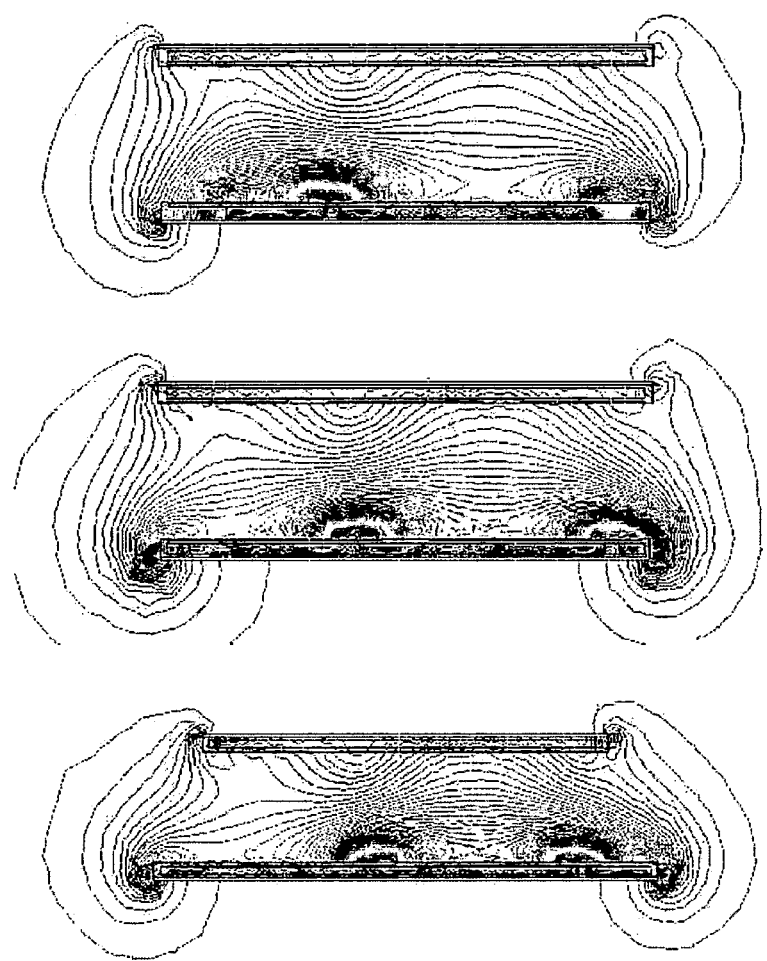
Figure 8: BPP with six (top), eight (middle) and ten (bottom) slabs making up each ferrite strip in the base, in the presence of a vertical offset DDQP pick-up at 0 degrees

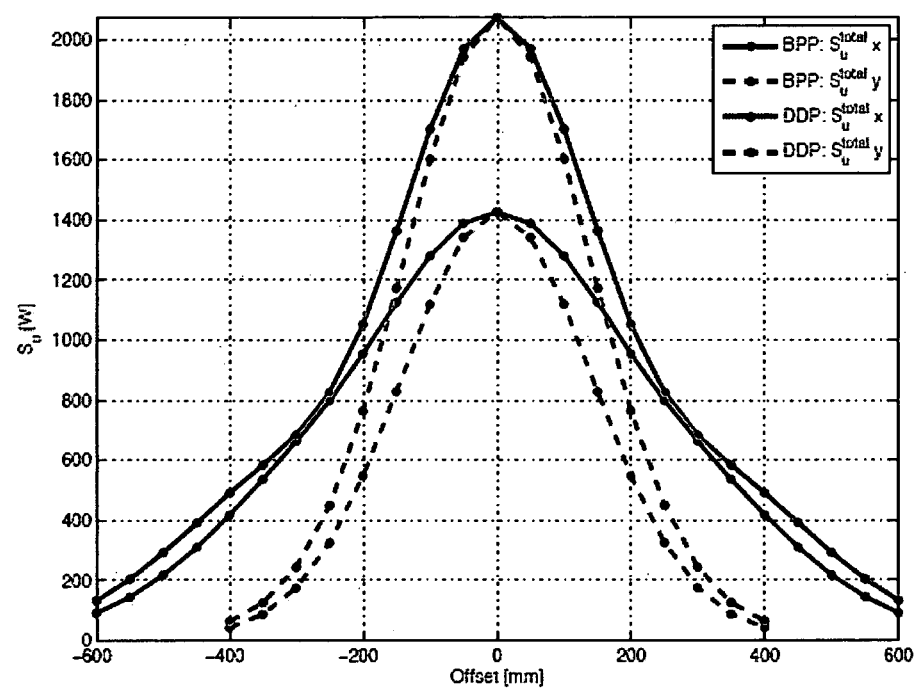
Figure 9: An example power transfer profile of a BPP(8) with a DDQP receiver

INDUCTIVE POWER TRANSFER SYSTEM

The present application is based on and claims the benefit of International Application Number PCT/NZ2010/000160 filed on Aug. 6, 2010, which claims priority from U.S. Provisional Application Ser. No. 61/273,701 filed Aug. 7, 2009 and the entire contents of each of which are herein incorporated by reference.

FIELD OF THE INVENTION

This invention relates to apparatus for generating or receiving magnetic flux. The invention has particular, but not sole, application to a low profile, substantially flat device such as a pad for power transfer using an inductive power transfer (IPT) system.

BACKGROUND

IPT systems, and the use of a pad which includes one or more windings which may comprise the primary or secondary windings for inductive power transfer, are reproduced in our published international patent application WO 2008/140333, the contents of which are incorporated herein by reference.

One particular application of IPT power transfer pads is electric vehicle charging, and that application is discussed in this section to provide the background to one application of the invention. However, electric vehicle charging is an example of only one application, and the invention has application to inductive power transfer in general. Electric vehicle charging may occur while the vehicle is stationary, or alternatively while the vehicle is moving along a roadway, for example. IPT power transfer pads can be used both in the vehicle as a power "pickup" (i.e. the secondary side winding of the IPT system), and at a stationary location such as a garage floor or a roadway for example as the "charging pad" (i.e. the primary side winding) from which power is sourced.

The purpose of an IPT roadway system is to wirelessly transfer power to a stationary or moving vehicle without physical contact to the vehicle. The transmitting part of the system consists of a power supply supplying a lumped coil (for example a pad as described above) or a track, with many similar lumped coils where such a system is tuned for operation at a suitable frequency, usually anywhere from 10 kHz to 150 kHz. Where the receiver is placed underneath a vehicle and coupled to receive power either when the vehicle is stationary above or near (in sufficiently close proximity to couple power) to the primary transmitter. The pickup receiver also typically comprises a lumped coil (such as a pad described above) which is connected to a converter and appropriate controller within the vehicle to regulate power. For convenience, the part of a roadway from which power may be received inductively is referred to herein as a track.

The track may be formed by placing a plurality of pads along the centre of a lane in a roadway. This results in the possibility of an essentially continuous supply of power to the vehicle as it moves along the roadway in the immediate vicinity of the track.

In recent years such systems have received increasing attention due to their potential to allow sustainable wireless powered personal transportation. For such a system to be useful it must not only be able to transfer sufficient power over an airgap of reasonable size (e.g. 100-300 mm) it must also prove tolerant to any displacements between track and pickup, to avoid dependency on a vehicle-to-track guidance system. In a roadway system such displacement will most likely occur in the lateral direction (orthogonal to both vertical and the direction of movement) for moving vehicles. For stationary vehicle charging the ability to transfer acceptable levels of power with suitable longitudinal displacement is of particular concern in order to ensure ease of parking. The power transfer profile in the pick-up pad is ideally a smooth power profile which is essentially constant (and sufficient) over as wide as possible a distance laterally, with smooth drop-offs at each end. Such a power transfer profile eases the demands on the electronic (primary and secondary) regulators in the system, enabling improved operating performance for a comparable coupling over a system where during operation significant variations are experienced in the coupling between the primary and receiver pads.

OBJECT OF THE INVENTION

It is an object of the present invention to provide apparatus for generating and/or receiving magnetic flux for the purposes of inductive power transfer, or to at least provide the public or the industry with a useful choice.

SUMMARY OF THE INVENTION

In one aspect the invention broadly provides a magnetic flux pad for generating or receiving magnetic flux, the pad comprising a magnetically permeable core, two substantially flat overlapping coils magnetically associated with the core whereby there is substantially no mutual coupling between the coils.

preferably the coils are substantially completely magnetically decoupled.

Preferably the coils partially overlap.

Preferably the coils are substantially coplanar.

Preferably the coils are provided on one side of the said permeable core, and a shielding means is provided on the other side of the core.

Preferably the shielding means comprises a shielding plate made of a suitable material such as aluminium.

Preferably a dielectric cover is provided on the side of the coils opposite the magnetic core.

Preferably the flux pad is adapted to receive currents from a power supply which are out of phase with each other to produce a time varying magnetic field which also varies spatially.

Preferably the field produced by the out-of-phase currents in the coils produces a time varying magnetic field which moves spatially and ultimately between the poles.

In a further aspect the invention provides primary power supply apparatus for an inductive power transfer system, the power supply apparatus including:
  a magnetic flux pad for generating a magnetic flux, the
    pad comprising magnetically permeable core, two substantially flat overlapping coils magnetically associated
    with the core; and
  power supply adapted to provide a current in one coil
    which has a different phase to a current in the other coil.

Preferably the power supply is adapted to adjust the phase to produce a field that varies with time and with spatial position on the pad.

Preferably the apparatus includes means to detect where a field is or is not required in the vicinity of the pad and adjust the phase in response to an output of the sensing means.

Preferably the power supply includes an inverter for each coil.

Preferably the power supply comprises two inverters which are synchronised with each other to produce a current in one coil which is 90° out of phase with the current in the other coil.

Preferably the magnetic flux pad produces a sliding time varying magnetic field.

Alternatively, the power supply means operates the coils 180° out of phase with each other. In this embodiment one inverter may be used.

In a further aspect the invention broadly provides a method for providing an IPT magnetic flux pad having a plurality of coils in which there is no mutual magnetic coupling between the coils, the method including the steps of:

overlapping the coils varying the overlap between the coils such that an overlap position is achieved whereby there is substantially no mutual coupling between the coils.

Preferably the absence of mutual coupling is detected by detecting when the open circuit voltage induced in one of the coils by energisation of the other coil is minimised.

Further aspects of the invention will become apparent from the following description.

DRAWING DESCRIPTION

One or more embodiments of the invention will be described with reference to the accompanying drawings in which:

FIG. 1 is a side view and a plan view respectively of a magnetic flux pad;

FIG. 2: is a side view and plan view respectively of the pad of FIG. 1 including a quadrature coil;

FIG. 3: is a side view and plan view respectively of an alternative form of magnetic flux pad;

FIG. 4: is a series of graphs of open circuit voltage coupled in one coil of the pad of the preceding figure as a function of overlap with the other coil when that other coil is energised;

FIG. 5: shows graphs of uncompensated power against offset for a vertical space of 150 mm and 250 mm respectively;

FIG. 6: is a graph of uncompensated power for three different flux pad constructions (according to FIG. 3) with the receiver pad offset either in the x or y direction at a vertical separation of 200 mm;

FIG. 7: illustrates field plots for the pad construction of FIG. 3 and FIG. 1 respectively at various instances of time over a full cycle of primary resonant current;

FIG. 8: shows the field plot of the pad construction of FIG. 3 with an increasing amount of ferrite in the core (from the top to the bottom direction);

FIG. 9: shows a graph of an example of a power transfer profile of a pad construction according to that shown in FIG. 3 with a receiver pad that accords with that shown in the example of FIG. 2.

DESCRIPTION OF ONE OR MORE PREFERRED EMBODIMENTS

Referring to FIG. 1, a magnetic flux pad construction is shown. For convenience, this general construction is referred to herein as a DDP pad, and is generally referenced DDP in the relevant drawing figures.

The DDP pad shown in FIG. 1 generally comprises two substantially coplanar coils referenced 2 and 3 which are magnetically associated with and sit on top of, a core 4. As can be seen from the drawing figure, the core 4 may consist of a plurality of individual lengths of permeable material such as ferrite strips or bars 5 which are arranged parallel to each other but spaced apart. The pad construction may include a spacer 6 on which the core is located, and a plate 7 below the spacer. In some embodiments a cover 8 may be provided on the other surface of the flat coils 2 and 3. Padding 9 may be provided about the periphery of the pad. As can be seen, the coils 2 and 3 each define a pole area 10 and 11 respectively. This DDP pad construction as shown in FIG. 1 shows very good characteristics suitable for IPT power transfer applications such as vehicle charging. The coils 2, 3 may be connected out of phase and driven by a single inverter to produce a stationary time varying magnetic field to couple to a receiver (which may for example be of substantially the same magnetic design) at distances suitable for electric vehicle power transfer with good coupling.

Turning now to FIG. 2, the DDP construction of FIG. 1 is shown but further including a quadrature coil 12 (referred to herein as a DDPQ pad). The quadrature coil extends the power transfer profile when there is lateral movement of the construction shown in FIG. 2 with respect to a flux generator such as the DDP pad of FIG. 1 when energised by an appropriate inverter. The quadrature coil allows power to be extracted from the "vertical" component of the magnetic field that the receiver pad intercepts while the other coils 2, 3 facilitate power extraction from the "horizontal" component of the flux intercepted. Therefore, the construction of FIG. 2 is suited as a flux receiver.

Turning now to FIG. 3, another construction is shown which is referred to in this document as a bi-polar pad or, alternatively, as a BPP pad. The BPP pad has a similar construction to the DDP pad discussed with respect to FIGS. 1 and 2 above as it enables excellent coupling to secondary receivers at distances suitable for charging and powering of electric vehicles.

The pad BPP consists, from bottom up, of an aluminium plate 7, a dielectric spacer 6, a core 4 comprising four rows of ferrite bars 5 (referred to herein as ferrites), two flat substantially coplanar, yet overlapping and ideally "rectangular" shaped coils 2, 3 (although in practice these are more oval due to the ease in winding Litz wire) spread out in the lateral direction, and a dielectric cover 8. The core 4 acts as a shield so that ideally all flux is directed away form the core 4 through the top of the pad. The plate 7 merely acts to a) eliminate and small stray or spurious fields that may be present beneath the core 4 in certain environments, and b) provide additional structural strength. The BPP is shown in FIG. 3, and Table A1 defines the actual dimensions investigated in simulation and for one experimental prototype.

The magnetic structure of the BPP is designed so that there is substantially no mutual coupling between either of the coils 2, 3 in the primary, as described later. This allows the coils to be driven independently at any magnitude or phase without coupling voltage into each other which if present would oppose the power output of such a coil.

In one mode of operation, the two coils within the BPP can be driven using two separate but synchronised inverters operating with known current magnitude and phase difference. If the coils are completely magnetically decoupled ideally there will be no power transfer between the primary inverters to limit power transfer to the secondary receiver.

In one embodiment the two inverters are synchronised but operated so as to produce currents with the same RMS magnitude, but operating 90 degrees out of phase in each of the coils 2, 3. (In a stationary application this would likely be two H bridge inverters with LCL structures tuned to resonance at the desired operating frequency the last L in each case being partially constructed using the pad inductance, where the primary inverters preferably have a common DC bus to simplify the input electronics from the mains. By having a 90° phase separation between the currents in the coils 2, 3, a spatially varying and time varying magnetic field is created rather than the stationary time varying magnetic field of the DDP. This is shown in FIG. 7 in which the left column represents a DDP pad and the right column represents a BPP pad. The spatial variation in the field of the BPP and appears as a sliding movement in alternate directions between the poles of the coils 2, 3.

It should be noted that other relative phase and/or magnitude variations between the currents in the coils could be used to shape the field if there is a need to reduce the field emissions on one side of the transmitter to avoid leakage during operation due to offset nature of the coupled receiver, for example to meet ICNIRP regulations. Thus the field may be directed in response to the output of a sensor for example which may sense where greater field strength is required, or where the field strength should be reduced. Also, the field strength may be time varying but spatially stationary dependent on where across the pad the field is required.

In a further embodiment it is also possible to operate the coils 2, 3 180 degrees out of phase so that they can be simply connected to one inverter (as in the DDP operation). This particular single phase operating mode is a second possible mode of operation to simplify the electronic control and power conversion that will produce a stationary time varying field as for the DDP.

As a means of comparison, the power transfer profile of a BPP with a sliding time varying magnetic field is evaluated against the power transfer profile of a DDP magnetic structure driven from a single phase primary supply at identical current and frequency (the dimensions of which are defined in Tables A2). Both systems are evaluated under identical conditions being coupled to an identical DDQP receiver (i.e. a DDP pad including a quadrative coil such as that of FIG. 2 used as a flux receiver) at identical height and offsets (the dimensions of which are defined in Table A3).

Given the BPP creates what may be termed a sliding time varying magnetic field it is desirable to determine the preferred length of the four ferrite strips 5 used in its base above which the coils 2, 3 are placed. As in the known DDP these ferrite strips 5 are used to enhance the power transfer and ensure that a predominately single sided flux field is created to best couple to the secondary power receiver, while ensuring that a minimal amount of ferrite is used to keep weight to a minimum and restrict the inductance of the pad. In such a sliding field it is shown that the ferrite strips should preferably extend under the winding coils otherwise the field may not be forced upwards towards the receiver.

In this evaluation the ferrite strips 5 were constructed using readily available slabs that are each a standard length of 93 mm. Each strip was conveniently chosen to be multiples of this length. Configurations with six (558 mm), eight (744 mm) and ten (930 mm) slabs lumped together were investigated. In all designs (apart from the 10 slab ferrite configuration) the external dimensions of the pad size of the BPP are identical to the DDP enabling a fair comparison. The ten piece ferrite configuration however forces the overall length (in the x direction) of the transmitter (or generator) pad to be increased beyond the standard length by 200 mm (compared to all other pads including the DDP configurations compared) and therefore is only included in evaluations to consider the impact of extensions to the ferrite beyond the coil dimensions. As indicated in Table A1 the distance between the ends of the two coils in all three BPP setups is identical although the overlap between the coils is set to that required to avoid mutual coupling arising between the primary coils.

When the two primary coils 2, 3 of the BPP are placed with an arbitrary overlap with respect to each other, there will be a mutual coupling between the coils. However for a certain ratio of overlap to coil width, denoted $r_o$, this mutual coupling is almost zero. The ideal overlap required to ensure no mutual coupling exists between each primary coil is not simple due the presence of the ferrite but can be determined by simply fixing one coil and energising this with a predetermined current at fixed frequency (either via a suitable 3D simulator or using a suitable experimental setup, for example). The open circuit voltage induced in the second primary coil can then be measured. If the second coil is moved so as to change the overlap there will be a change in coupled voltage. When this is minimised (ideally zero) the ideal configuration can be set. As shown in FIG. 4, the optimal overlap is dependent on the length of the ferrite strips underneath the coils. For the six, eight and ten piece ferrite pad the overlapping ratio, $r_o$ was found to be 0.53, 0.34 and 0.25 respectively.

The finite element solver JMAG Studio™ version 10.0 was used to simulate all proposed magnetic structures. Validation of the simulator outputs was confirmed by constructing a prototype BPP in the laboratory using ferrite strips comprised of 6 ferrite slabs in the base and compared against simulations. This scaled model used the external dimensions of table A1 for the BPP but simplified coils with only 10 turns each to simplify the construction. The receiver was a DDQP as described in table A3. The comparison between measurement and simulation of FIG. 5 shows excellent correlation.

The power profiles given here are the total uncompensated VA power output which is determined using separate measurements of the receiver open circuit voltage ($V_{oc}$) and short circuit current ($I_{sc}$). The uncompensated VA is a well known measure of the power performance of a pad given by $S_u = V_{oc} * I_{sc}$. The DDQP receiver has two sets of coils, the coils 2, 3 (assuming they are in series) and the quadrature (Q) coil 12. In this case the uncompensated power is found for both sets of coils separately and the total uncompensated power available from the pickup is referred to as the total power which is simply calculated as the sum of the power from the two sets of coils. It is this total power which underlies the power transfer profile.

The power transfer profile of each BPP design can therefore be confidently determined using 3D simulation and is shown in FIG. 6. Here the BPP is excited with a 20 kHz current with 23 A rms while the receiver is the DDQP. The parameters governing their relative position are referred to as the offset distances, in Cartesian coordinates, that is: $x_{os}$ (lateral), $y_{os}$ (longitudinal) and $z_{os}$ (vertical). The configuration of the two pads lying on top of each other with their dielectric covers 8 touching is (0,0,0). The vertical offset $z_{os}$ is 200 mm.

Notably there is a significant increase in power when the ferrite under the coils is extended, and it is clear that the ferrite should extend at least under the entire coil 2, 3 (BPP with 8 ferrite slabs). The reason for the drastic increase in uncompensated power from the BPP as ferrite is added to its base, lies in the non-stationary nature of its magnetic field. The field close to the BPP pad can best be described as a sliding wave across the surface, unlike the DDP which pulsates up and down due to its single phase nature. This sliding nature, and fundamental difference, between the BPP and the single phased DDP, is clearly evident in FIG. 7, where the magnetic flux density is compared phase by phase for half a period. In FIG. 7 field plots of both the BPP8 and DDP coupling to a DDQP receiver are shown, at various instances in time over a full cycle of the primary resonant current. From top to bottom shows 0, 30, 60, 90, 120 and 150 degrees (where in the bipolar the other phase is operated with 90 degree separation). The plots in the left column are for a BPP pad with 8 ferrite slabs. The plots in the right column are for a DDP pad. The flux from the single phase DDP pad pulsates up and down, having a very strong and confined flux centred over the pad, whereas the BPP has a more constant flux pattern-wise, but this pattern shifts over the surface of the pad like a sliding wave as the phase advances.

The sliding wave of the BPP gives rise to very localised high flux on the edge of pad, whereas the DDP pad keeps the strong flux in the centre of the pad. In the six piece version there is no ferrite under the ends of the coils, and the flux is not contained well enough by the dielectric filling material 6 (wood). It is therefore not radiated upwards, but rather inducing eddy currents in the aluminium base plate 7 of the pad. In FIG. 8 the three setups are compared for the same phase. FIG. 8 shows field plots for a BPP pad with six (top), eight (middle) and ten (bottom) slabs making up each ferrite strip in the base, in the presence of a vertical offset DDQP receiver at 0 degrees. The flux density appears qualitatively different, especially around the right edge where the flux density is high for the eight and ten ferrite setups, but not for the six ferrite setup. In the ten ferrite version, the flux is even better confined, with less of the field "wrapping around" the side of the track pad, again a factor responsible for decreasing the power transfer, since the field will not be pushed towards the pickup (i.e. the receiver pad) as desired.

The BPP with the eight ferrite slabs in each ferrite base strip (BPP8) is compared to the DDP in FIG. 9. The power transfer profile of the BPP8 compared against the profile of the DDP reveals the very evident differences in shape and maximum. As configured, the BPP8 yields around 70% of the DDP's maximum power and has similar power profile shapes. The power levels shown and coupling achieved is however sufficient to deliver suitable levels of power to an electric vehicle for example, at distances required for practical application and furthermore do not exhibit as significant a rate of change of variation of power around the peak with offset as that seen in the DDP power profile. This limited rate of charge of power is an advantage when considering power highway applications given there will not be severe fluctuations in power with lateral movement.

TABLE A1

Dimensions of the BPP

Common Dimensions

| | |
|---|---|
| Winding width | 80 mm |
| Ferrite spacing | 32 mm |
| Ferrite width | 28 mm |
| Y coil spacing | 50 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |

Variations based on number of ferrites
A: BBP6: using 6 ferrite slabs to make each ferrite strip

TABLE A1-continued

Dimensions of the BPP

| | |
|---|---|
| (BPP6) Ferrite length | 558 mm |
| (BBP6) Overlap | 156 mm |
| X coil spacing | 10 mm |
| X padding | 10 mm |

B: BBP8: using 8 ferrite slabs to make each ferrite strip

| | |
|---|---|
| Ferrite length | 774 mm |
| Overlap | 74 mm |
| X coil spacing | −83 mm (−represents an overlap) |
| X padding | 10 mm |

C: BBP10: using 10 ferrite slabs to make each ferrite strip

| | |
|---|---|
| Ferrite length | 930 mm |
| Overlap | 39 mm |
| X coil spacing | −174 mm (−represents an overlap) |
| X padding | 110 mm (nb: 200 mm added overall to padding to fit extra ferrites) |

TABLE A2

Dimensions of the DDP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |

TABLE A3

Dimensions of the DDQP

| | |
|---|---|
| Winding width | 80 mm |
| Inner winding width | 120 mm |
| Ferrite spacing | 32 mm |
| Ferrite width | 28 mm |
| Y coil spacing | 10 mm |
| Y padding | 46 mm |
| Cover thickness | 6 mm |
| Coil height | 4 mm |
| Ferrite height | 16 mm |
| Spacer thickness | 6 mm |
| Plate thickness | 4 mm |
| Ferrite length | 558 mm |
| X coil spacing | 10 mm |
| X padding | 10 mm |
| Quadrature coil length | 534 mm |

Where in the foregoing description, reference has been made to specific components or integers of the invention having known equivalents then such equivalents are herein incorporated as if individually set forth.

Although this invention has been described by way of example and with reference to possible embodiments thereof, it is to be understood that modifications or improvements may be made thereto without departing from the scope or spirit of the invention.

The invention claimed is:
1. A magnetic flux pad for generating or receiving magnetic flux, the magnetic flux pad comprising:

a magnetically permeable material comprising a plurality of ferrite strips; and two substantially overlapping coils sitting on top of the magnetically permeable material and magnetically associated with the magnetically permeable material, whereby the overlap of the coils is adjusted to substantially minimize mutual coupling between the coils.

2. A magnetic flux pad as claimed in claim 1 wherein the coils are substantially completely magnetically decoupled.

3. A magnetic flux pad as claimed in claim 1 wherein the coils partially overlap.

4. A magnetic flux pad as claimed in claim 1 wherein the coils are substantially coplanar.

5. A magnetic flux pad as claimed in claim 1 wherein the coils are provided on one side of the magnetic permeable material, and a shielding means is provided on the other side of the magnetic permeable material.

6. A magnetic flux pad as claimed in claim 5 wherein the shielding means comprises a shielding plate made of a suitable aluminum material.

7. A magnetic flux pad as claimed in claim 1 further comprising a dielectric cover provided on a side of the coils opposite the magnetically permeable material.

8. A magnetic flux pad as claimed in claim 1 wherein the flux pad is adapted to receive currents from a power supply which are out-of-phase with each other to produce a time varying magnetic field which also varies spatially.

9. A magnetic flux pad as claimed in claim 8 wherein the time varying magnetic field produced by the out-of-phase currents in the coils produces a time varying magnetic field which moves spatially and alternately between poles.

10. A power supply apparatus for an inductive power transfer system (IPT), the power supply apparatus comprising:

a magnetic flux pad for generating a magnetic flux, the magnetic flux pad comprising a magnetically permeable material comprising a plurality of ferrite strips, two substantially overlapping coils sitting on top of the magnetically permeable material and magnetically associated with the magnetically permeable material; and a power supply adapted to provide a current in one of the overlapping coils which has a different phase to a current in the other of the overlapping coils.

11. A power supply apparatus as claimed in claim 10 wherein the power supply is adapted to adjust the phase to produce a field that varies with time and with spatial position on the magnetic flux pad.

12. A power supply apparatus as claimed in claim 10 further comprising means to detect where a field is or is not required in a vicinity of the magnetic flux pad and adjust relative phase and/or amplitude of the current in the overlapping coils in response to an output of a sensing means.

13. A power supply apparatus as claimed in claim 10 wherein the power supply includes an inverter for each of the overlapping coils.

14. A power supply apparatus as claimed in claim 10 wherein the power supply comprises two inverters which are synchronized with each other to produce a current in the one of the overlapping coils which is 90° out of phase with the current in the other of the overlapping coils.

15. A power supply apparatus as, claimed in claim 10 wherein the magnetic flux pad produces a sliding time varying magnetic field.

16. A power supply apparatus as claimed in claim 10 wherein the power supply operates the overlapping coils 180° out of phase with each other.

17. A power supply apparatus as claimed in claim 16 wherein the power supply includes one inverter for energizing both coils.

18. A method for providing an Inductive Power Transfer (IPT) magnetic flux pad comprising a plurality of ferrite strips and two coils sitting on top of the plurality of ferrite strips, the method comprising:

overlapping the coils, and varying the overlap between the coils such that an overlap position is achieved whereby mutual coupling between the coils is substantially minimized.

19. A method as claimed in claim 18 wherein absence of mutual coupling is detected by detecting when an open circuit voltage induced in one of the coils by energization of the other coil is minimized.

20. A magnetic flux pad as claimed in claim 2 wherein the coils partially overlap.

21. A power supply apparatus as claimed in claim 11 further comprising means to detect where a field is or is not required in a vicinity of the magnetic flux pad and adjust relative phase and/or amplitude of the current in the overlapping coils in response to an output of a sensing means.

22. A power supply apparatus as claimed in claim 13 wherein the power supply comprises two inverters which are synchronized with each other to produce a current in the one of the overlapping coils which is 90° out of phase with the current in the other of the overlapping coils.

23. A magnetic flux pad as claimed in claim 1 wherein the magnetically permeable material includes a plurality of lengths of permeable material.

24. A magnetic flux pad as claimed in claim 23 wherein the lengths of permeable material are arranged parallel to, but spaced apart from, each other.

25. A magnetic flux pad as claimed in claim 24 wherein the lengths of permeable material extend under an entirety coils.

26. A power supply apparatus as claimed in claim 10 wherein the overlap between the overlapping coils is adjusted to reduce mutual coupling between the coils.

27. A method as claimed in claim 18 further comprising overlapping the coils in presence of a permeable magnetic material.

28. A magnetic flux pad as claimed in claim 1 configured to generate a magnetic field to provide power to a vehicle.

* * * * *

UNITED STATES PATENT AND TRADEMARK OFFICE
CERTIFICATE OF CORRECTION

PATENT NO. : 10,566,838 B2  
APPLICATION NO. : 13/389090  
DATED : February 18, 2020  
INVENTOR(S) : Grant Anthony Covic and Michael Le Gallais Kissin Page 1 of 1

It is certified that error appears in the above-identified patent and that said Letters Patent is hereby corrected as shown below:

In the Claims

Column 10, Line 14, insert --of the overlapping-- after "both".

Signed and Sealed this  
Twenty-fifth Day of August, 2020

Andrei Iancu  
*Director of the United States Patent and Trademark Office*